(12) United States Patent
Rai et al.

(10) Patent No.: US 8,886,793 B2
(45) Date of Patent: Nov. 11, 2014

(54) METHODS AND SYSTEMS FOR ADJUSTING A TRAFFIC RATE FOR A MSRP SESSION

(75) Inventors: Shambhu Dayal Rai, New Thippasandra (IN); Nagesh Kumar Bollapalli, Bangalore (IN); Fardad Farahmand, Wellesley, MA (US); Tolga Asveren, Bordentown, NJ (US)

(73) Assignee: Sonus Networks, Inc., Westford, MA (US)

( * ) Notice: Subject to any disclaimer, the term of this patent is extended or adjusted under 35 U.S.C. 154(b) by 703 days.

(21) Appl. No.: 12/979,821

(22) Filed: Dec. 28, 2010

(65) Prior Publication Data

US 2012/0166626 A1    Jun. 28, 2012

(51) Int. Cl.
*G06F 13/00*     (2006.01)
*H04L 12/64*     (2006.01)

(52) U.S. Cl.
CPC .................................. *H04L 12/6418* (2013.01)
USPC ....................................................... 709/224

(58) Field of Classification Search
CPC ..... H04L 43/00; H04L 12/2602; H04L 41/22; H04L 12/6418
USPC ............................................ 370/400; 709/224
See application file for complete search history.

(56) References Cited

U.S. PATENT DOCUMENTS

2009/0268742 A1 *   10/2009   Hama ........................... 370/400

OTHER PUBLICATIONS

Telecommunications and Internet Converged Services and Protocols for Advance Networking (TISPAN); Next Generation Networks; Architecture for Control of Processing Overload; ETSI TR 182 015 v1.1.1 (Oct. 2006), 48 pgs., 2006.

* cited by examiner

*Primary Examiner* — Robert B Harrell
(74) *Attorney, Agent, or Firm* — Straub & Pokotylo; Michael P. Straub; Stephen T. Straub (57) ABSTRACT

A system and method is provided for adjusting a traffic rate for a Message Session Relay Protocol (MSRP) session established between two network nodes at a per session level. Each MSRP session has a traffic rate for which MSRP messages are transmitted over the MSRP session. The traffic rate per session can be adjusted, and the adjusted traffic rate per session can be communicated to adjacent nodes.

20 Claims, 5 Drawing Sheets

METHODS AND SYSTEMS FOR ADJUSTING A TRAFFIC RATE FOR A MSRP SESSION

FIELD OF THE INVENTION

The invention relates generally to communication between clients using Message Session Relay Protocol (MSRP), and more particularly, to avoiding congestion during MSRP sessions that use Transmission Control Protocol (TCP) sessions.

BACKGROUND OF THE INVENTION

Message Session Relay Protocol (MSRP) is a protocol for transmitting Multipurpose Internet Mail Extensions (MIME) content that is arbitrary and binary (e.g., a series of related instant messages) in the context of a session. The MSRP protocol is defined by a standard known as Request for Comments (RFC) (e.g., RFC 4975 and RFC 4976).

MSRP sessions are typically arranged using Session Initiation Protocol (SIP) or Session Description Protocol (SDP). Multiple MSRP messages can be transmitted during one MSRP session. The data transfer during a MSRP session can be established over reliable connection oriented transports (e.g., TCP or Transport Layer Security (TLS)). Multiple MSRP sessions can be established over a single TCP connection with the use of MSRP relay servers.

The MSRP protocol assumes a reliable transport. When a transmission of a MSRP message fails, there is not a retransmission of the MSRP message on a MSRP layer. TCP congestion handling only acts on an aggregate of all the MSRP sessions using the TCP session. Therefore, a single MSRP session that is congested can cause MSRP messages to drop, but not trigger a TCP session's congestion handling. The MSRP protocol does not provide for transmitting a message to a message sender to adjust the rate at which the message sender is transmitting messages over a MSRP session (e.g., the traffic rate per session).

MSRP messages for a congested MSRP session are either discarded or buffered on a MSRP relay server. Uncongested MSRP sessions sharing the same TCP connection as the congested message can also be discarded or buffered. For example, MSRP client A has a first MSRP session with MSRP client B and MSRP client C has a second MSRP session with MSRP client D. The first MSRP session and the second MSRP session are transported on the same TCP connection through a first MSRP relay and a second MSRP relay. If a connection between the second MSRP relay and MSRP client D becomes congested, the second MSRP relay buffers all MSRP messages it is suppose to transmit to MSRP client D. Once the second MSRP relay buffers becomes full, the second MSRP relay discards additional MSRP messages it receives and stops reading incoming MSRP messages from the first MSRP relay. Thus, the first MSRP session between MSRP client A and MSRP client B also fails although only the second MSRP session is congested.

SUMMARY OF THE INVENTION

The traffic rate per session of a MSRP session can be dynamically adjusted based on policy (e.g., class of service, time of day), to allow for reallocation of bandwidth by a network operator and/or to handle congestion of the MSRP session. When a TCP connection has multiple MSRP sessions, if one MSRP session becomes congested, the other MSRP sessions can be prevented from becoming congested. Network congestion can be communicated to adjacent network nodes at an MSRP session level and network operators can allocate network resources dynamically.

The invention, in one aspect, features a method of dynamically adjusting a traffic rate per session during a messaging session relay protocol (MSRP) session. The method involves receiving, by a first server, the MSRP session request from a second server, adjusting, by the first server, the traffic rate per session based on at least one of policy or scarcity of one or more resources that are internal or external to the first server, and transmitting, by the first server, the adjusted traffic rate per session to the second server.

The invention, in another aspect, features a computer program product, tangibly embodied in a non-transitory machine-readable storage device, for dynamically adjusting a traffic rate per session during a MSRP session. The computer program product is operable to cause a first server to receive the MSRP session request from a second server, adjust the traffic rate per session based on at least one of policy or scarcity of one or more resources that are internal or external to first server, and transmit the adjusted traffic rate per session to the second server.

The invention, in another aspect, features a system for adjusting a traffic rate per session during a messaging session relay protocol (MSRP) session. The system includes means for receiving a MSRP session request from a second server, means for adjusting the traffic rate per session based on at least one of policy or scarcity of one or more resources that are internal or external to first server, and means for transmitting the adjusted traffic rate per session to the second server.

In some embodiments, any of the above aspects can include one or more of the following features. In some embodiments, the scarcity of one or more resources that are internal or external to the first server includes one or more of a congestion condition of the first server or a status of one or more network elements connected to the first server.

In some embodiments, adjusting the traffic rate per session includes increasing the traffic rate per session by a value if the congestion condition is such that a Transmission Control Protocol (TCP) connection to the first server has less active MSRP messages than a maximum number of active MSRP messages for longer than a monitoring interval.

In some embodiments, adjusting the traffic rate per session includes decreasing the traffic rate per session by a value if the congestion condition is such that a Transmission Control Protocol (TCP) connection to the first server has more active MSRP messages than a maximum number of active MSRP messages longer than a monitoring interval.

In some embodiments, the monitoring interval is determined by the first server. In some embodiments, adjusting the traffic rate per session includes setting the traffic rate per session to a value based on a second traffic rate per session received from a third server.

In some embodiments, monitoring interval has a first value while the TCP connection to the first server has less active MSRP sessions than a maximum number of active MSRP messages and more active MSRP messages than a minimum number of active MSRP messages, and the monitoring interval has a second value while the TCP connection to the first server has more active MSRP messages than a maximum number of active MSRP messages. The second value is less than the first value.

In some embodiments, the second value decreases exponentially as a duration that the TCP connection to the first server has more MSRP messages than a maximum number of active MSRP messages increases. In some embodiments, the second value decreases logarithmically as a duration that the TCP connection to the first server has more MSRP messages than a maximum number of active MSRP messages increases.

In some embodiments, the method includes determining, by the first server, a number of active MSRP messages of the TCP connection based on a number of MSRP messages in an egress TCP buffer of the first server. In some embodiments, the method includes determining, by the first server, a number of active MSRP messages of the TCP connection based on a number of MSRP messages in egress application buffer of the first server.

In some embodiments, the adjusted traffic rate per session is transmitted via a MSRP message, a SIP message header, or a Session Description Protocol attribute. In some embodiments, the method includes receiving, by the first server, a second MSRP session request from a fourth server, wherein the fourth server transmits the second MSRP session request via the TCP connection.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF ILLUSTRATIVE EMBODIMENTS

In general overview, a MSRP network node (e.g., MSRP relay, MSRP application server, and MSRP users) can adjust a traffic rate per session for its own MSRP sessions and transmit the adjusted traffic rate per session to adjacent nodes.

The MSRP protocol is defined by RFC 4975 and RFC 4976. MSRP sessions are typically arranged using SIP or SDP. The RFC 4145 standard defines how to setup MSRP session over TCP with SDP. In a MSRP session defined by RFC 4975, a first SIP user client sends a second SIP user client a SIP invitation containing an offered session-description that includes a session of MSRP. The second SIP user client can accept the invitation and include an answer session-description that acknowledges the choice of media.

MSRP can use a reliable connection oriented transport such as TCP to transfer data. The RFC 4975 standard defines two MSRP request types or techniques: 1) SEND requests are used to deliver a complete message or a portion of a complete message, and 2) REPORT requests reports on the status of a previously sent message or a range of bytes inside a message.

A SEND request can trigger a successful or failure transaction response indicating the status of SEND request processing.

The RFC 4976 standard extends the RFC 4975 MSRP protocol to introduce MSRP relays (e.g., intermediary call relays). The MSRP protocol allows MSRP clients to communicate directly, or through an arbitrary number of MSRP relays. With MSRP relays, MSRP messages are transmitted through one or more stand alone servers to assist traversal of instant messaging and file transfer sessions between MSRP clients (e.g., nodes). Each MSRP client is responsible for identifying any MSRP relays acting on its behalf and providing appropriate credentials.

MSRP relays can provide one or many of the following functions: 1) transfer arbitrary binary MIME data without modification or transfer encoding over MSRP session, 2) allow MSRP relays to use one or a small number of TCP or TLS connections to carry messages for multiple MSRP session recipients and/or senders by multiplexing MSRP sessions over a TCP connection, 3) splitting MSRP messages that have a large payload into multiple MSRP messages, 4) operate through relays under differing administrative control prevent unsolicited messages (spam), "open relays", and Denial of Service (DoS) amplification, 5) allow transmission of large messages to be interrupted and resumed in places where network connectivity is lost and later reestablished, 6) relay send notification (REPORT or response) indicating status of message delivery failure at any intermediary, 7) authenticate and authorize the user, and/or 8) provide public identity to users behind Network Address Translation device—MSRP relay provides a path to the MSRP User Equipment at the time of authentication (using AUTH method).

Figure 1:
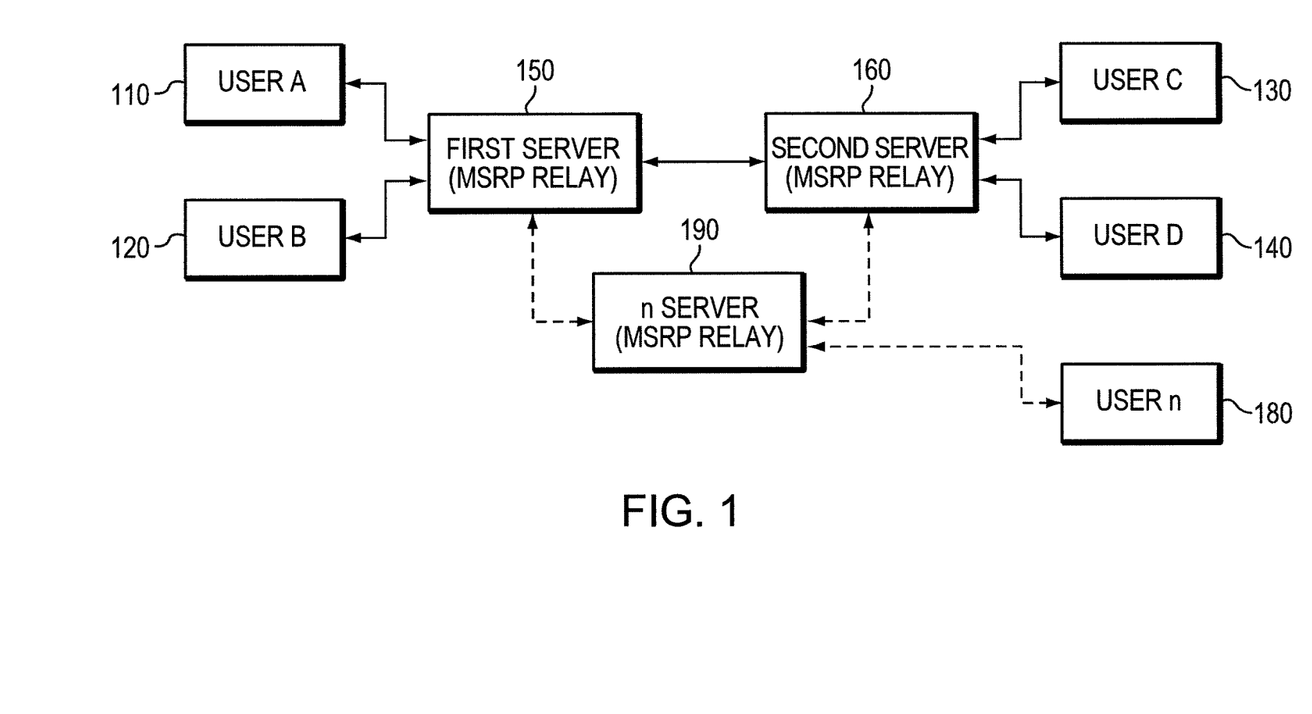
FIG. 1 is a block diagram showing a network including multiple nodes.

FIG. 1 is a block diagram showing a network 100 including multiple nodes. Specifically, network 100 includes user A 110, user B 120, user C 130, user D 140, a first server 150, and a second server 160. In various embodiments, any number of users (e.g., user n 180) is connected to any number of servers (e.g., n server 190). One of ordinary skill in the art can appreciate that the network shown in FIG. 1 can include many other network elements (e.g., MSRP application servers) not shown in FIG. 1.

One or more MSRP sessions can be established between the network nodes in network 100. One or more MSRP messages can be transmitted over each established MSRP session. A MSRP session can be established between two adjacent network nodes (e.g., user A 110 and the first server 150 or between two indirectly connected network nodes (e.g., user A 110 and user C 130). To establish a MSRP session between two network nodes that are not directly connected, multiple MSRP sessions can be established between adjacent nodes. Upon establishing the one or more MSRP sessions user A 110 and user C 130 can transmit MSRP messages to each other.

One or more MSRP messages can be transmitted over an existing TCP connection between two nodes. Each MSRP session can be established over a dedicated TCP/TLS connection or multiple MSRP sessions can be established over a single TCP/TLS connection. The MSRP messages of each MSRP session can be transmitted via the transport of the MSRP session.

Each MSRP session can have a traffic rate per session, which defines the rate at which MSRP messages can be transmitted over a particular MSRP session. The traffic rate per session can be dynamically updated such that it varies over the duration of a MSRP session. The traffic rate per session can be communicated between the network nodes. For example, if user A 110 adjusts the traffic rate per session for the MSRP session between user A 110 and user C 130, the traffic rate per session for at least one of a first MSRP session, the second MSRP session or the third MSRP session can be updated by transmitting the traffic rate per session to the first server 150, the second server 160 or user C 130.

In some embodiments, user A 110, user B 120, user C 130, user D 140, the first server 150, and/or the second server 160 are MSRP relays. In some embodiments, user A 110, user B 120, user C 130, user D, the first server 150, and/or the second server include one or more transmit buffers that store MSRP messages to transmit. In some embodiments, user A 110, user B 120, user C 130, user D 140, the first server 150, and/or the second server 160 include one or more receive buffers that store received MSRP messages. In some embodiments, user A 100, user B 120, user C 130, and/or user D 140 are Voice Over Internet Protocol (VOIP) devices. In various embodiments, user A 100, user B 120, user C 130, and/or user D 140 are Global System for Mobile Communications (GSM) network elements.

Figure 2:
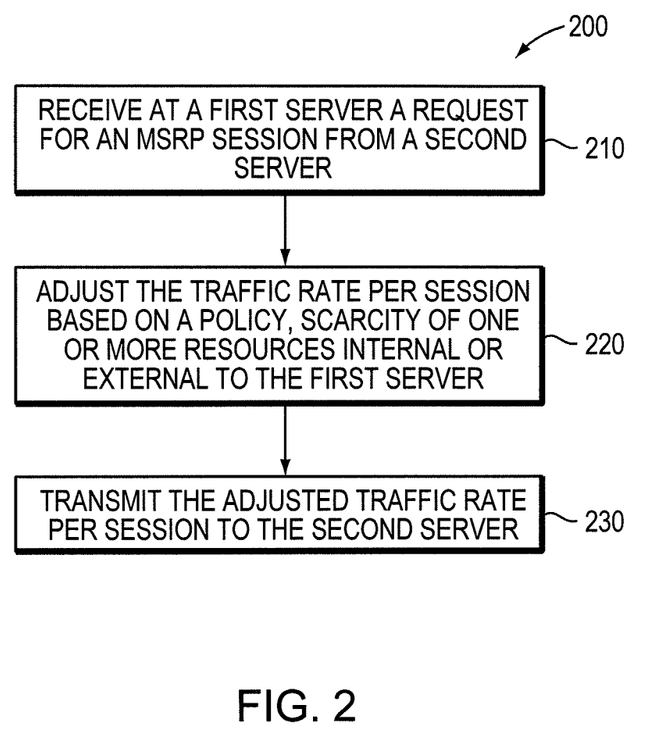
FIG. 2 is a flow chart illustrating a process for dynamically adjusting a traffic rate per session during a MSRP session.

FIG. 2 is a flow chart 200 illustrating a process for dynamically adjusting a traffic rate per session during a MSRP session. A first server (e.g., first server 150 as described above in FIG. 1) receives a request from a second server (e.g., user A 110 as described above in FIG. 1) for a MSRP session (step 210). The first server can determine an initial traffic rate per session based on a bandwidth received from the second server, a default configuration of the first server, and/or local policies of the first server. In some embodiments, the first server and the second server exchange messages to determine the traffic rate per session. In some embodiments, the traffic rate per session is based on the media type of the MSRP session. For example, the traffic rate per session can be 64 kbps for a MSRP chat session and 256 kbps for a MSRP file transfer session.

The first server adjusts the traffic rate per session based on a policy and/or scarcity of one or more resources internal or external to the first server (step 220). In some embodiments, the policy is based on class of service, time of day, day of week, priorities of subscribers, and/or government emergency traffic requirements. For example, the traffic rate per session can be decreased during peak hours to allow for a higher number of MSRP sessions to be established over the same TCP connection or increased for subscribers that have a high class of service.

The first server transmits the adjusted traffic rate per session to the second server (step 230).

As discussed above, each node of a network that transmits and receives MSRP messages (e.g., the first server 150 as discussed above in FIG. 1) can adjust the traffic rate per session of a MSRP session based on scarcity of an internal resource. Each node can monitor its own transmit and/or receive buffers to determine when there are more MSRP messages pending than it can transmit and/or receive.

Figure 3:
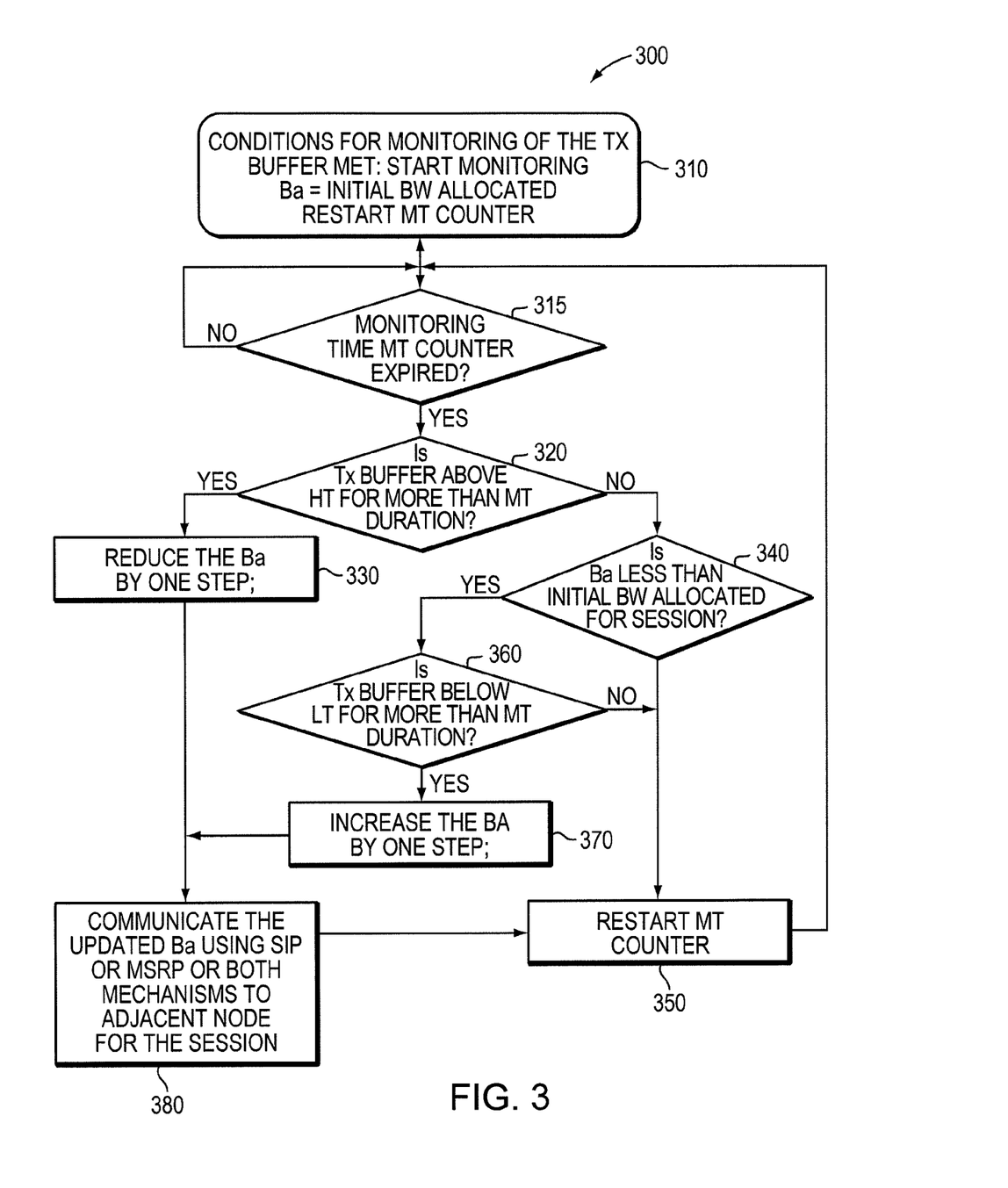
FIG. 3 is a flowchart illustrating a process for a node to dynamically adjust its traffic rate per session during a MSRP session based on scarcity of an internal resource of the node.

FIG. 3 is a flowchart 300 illustrating a process for a node to dynamically adjust its traffic rate per session during a MSRP session based on scarcity of an internal resource of the node. The node determines whether conditions for monitoring its own MSRP buffers are met (step 310). In some embodiments, the node does not monitor its transmit MSRP buffers if multiple MSRP sessions exist over the same TCP connection. In some embodiments, if a MSRP message sender node has a shared TCP connection and a MSRP message receiver node does not have shared TCP connection, the MSRP message receiver node monitors its transmit MSRP buffers. In various embodiments, the transmit MSRP buffers are TCP transmit buffers or MSRP application buffers. In some embodiments, MSRP application buffers are monitored if MSRP transmit and MSRP receive buffers both have multiple active MSRP sessions.

The node determines if a monitoring interval is expired (step 305). The monitoring interval dictates a frequency at which the traffic rate per session can be adjusted. The monitoring interval can be a constant. For example, the monitoring interval can be set to 60 seconds, 10 second, 2 seconds or 0.5 seconds. The monitoring interval can be a function of the frequency of the node and/or the responsiveness of the congestion detection. In some embodiments, the monitoring interval varies linearly, logarithmically, or exponentially based on how many MSRP messages are in a MSRP buffer for a given duration. For example, the monitoring interval can decrease exponentially if a MSRP buffer is overloaded for longer than three monitoring intervals.

If the monitoring interval is not expired, then step 315 can be repeated. If the monitoring interval is expired, then the node can determine if the number of MSRP messages in the MSRP buffer of the node is greater than a maximum number of MSRP messages threshold for longer than the monitoring interval (step 320). The maximum number of MSRP messages threshold can be set by an operator, a function of the size of the MSRP buffer, and/or a function of a bandwidth of a network the node is connected to.

If the number of MSRP messages in the MSRP buffer is greater than the maximum number of MSRP messages threshold, then the traffic rate per session is reduced (step 330). If the number of MSRP messages in the MSRP buffer is less than the maximum number of MSRP message threshold, then the node determines if the traffic rate per session is less than the initial traffic rate per session (step 340).

If the traffic rate per session is not less than the initial traffic rate per session, then the monitoring interval is restarted (step 350). If the traffic rate per session is less than the initial traffic rate per session, then the node determines if the number of MSRP messages in the MSRP buffer is less than a maximum number of MSRP messages threshold (step 360).

If the number of MSRP messages in the MSRP buffer is not less than the maximum number of MSRP messages threshold, then the monitoring interval is restarted (step 360). If the number of MSRP messages in the MSRP buffer is less than the maximum number of MSRP messages threshold, then increase the traffic rate per session. (step 370).

If the traffic rate per session has been updated (e.g., increased or decreased), then transmit the updated traffic rate per session to one or more adjacent nodes (step 380). The increase and/or decrease in the traffic rate per session can be linear, exponential or logarithmic.

Each network node with MSRP sessions can adjust its traffic rate per session based on scarcity of an external resource. For example, a first network node can receive a traffic rate per session from a second network node. The first network node can modify its traffic rate per session to the received traffic rate per session. Each network node can transmit the received traffic rate per session to one or more adjacent nodes. For example, if a first node adjusts a first traffic rate per session for a first MSRP session between a first node and a second node by transmitting an adjusted traffic rate per session to the second node, the second node can adjust a second traffic rate per session for a second MSRP session between the second node and a third node by transmitting the adjusted traffic rate per session to the third node.

Figure 4:
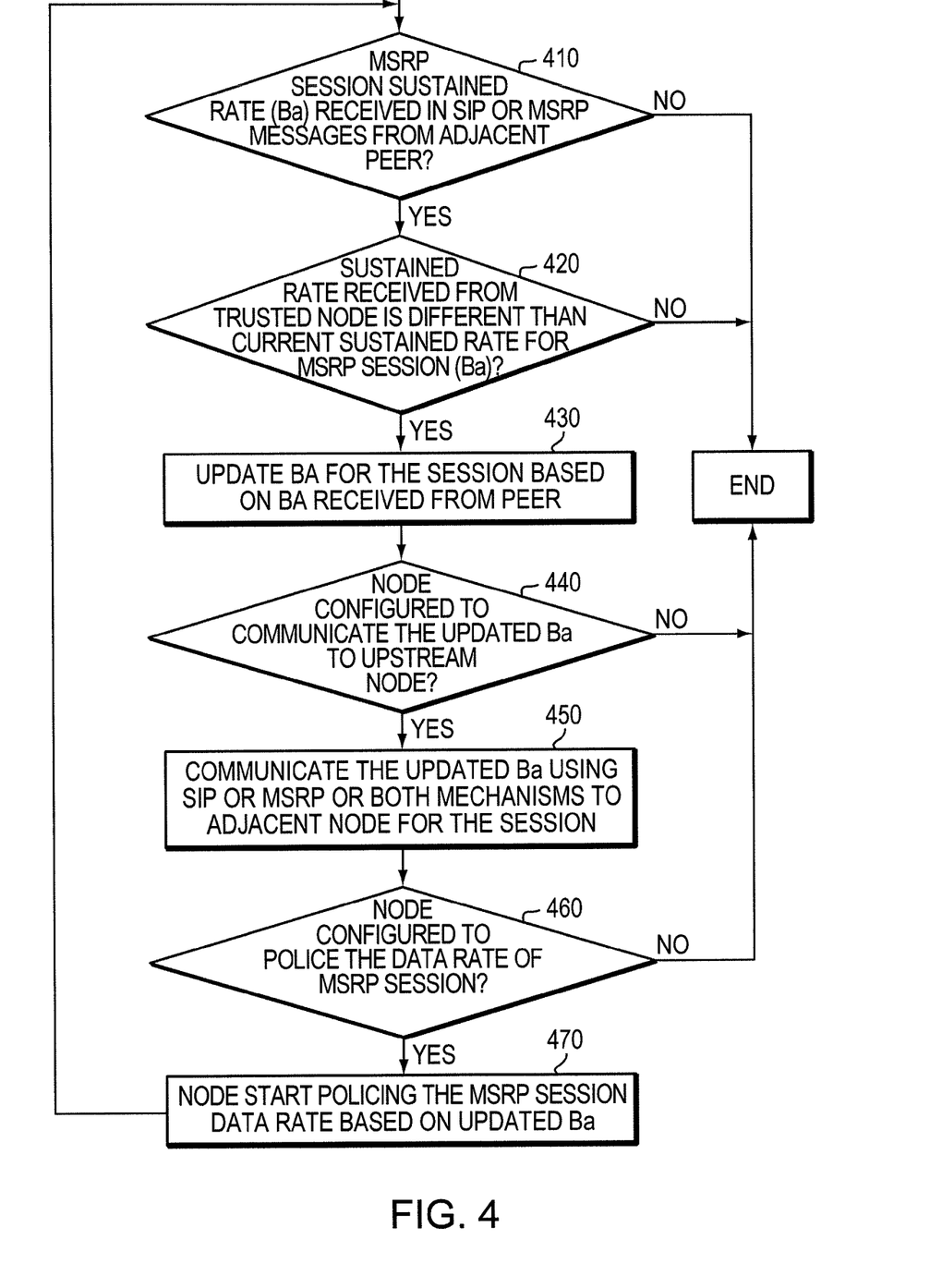
FIG. 4 is a flowchart illustrating a process for a node to dynamically adjust its traffic rate per session during a MSRP session based on scarcity of an external resource of the node.

FIG. 4 is a flowchart 400 illustrating a process for a node to dynamically adjust a traffic rate per session for a MSRP session based on scarcity of an external resource of the node.

A traffic rate per session is received at a node (step 410). The traffic rate per session can be received in a SIP message or a MSRP message.

The node determines if the received traffic rate per session is different than its own traffic rate per session (step 420). If the received traffic rate per session is not different from the node's traffic rate per session, then the node does not adjust its traffic rate per session and the process ends. If the received traffic rate per session is different from the node's traffic rate per session, then the node adjusts its traffic rate per session to the received traffic rate per session (step 430).

The node determines if it is configured to update adjacent nodes with its adjusted traffic rate per session (step 440). If the node is not configured to update adjacent nodes, then the node does not transmit its adjusted traffic rate per session to adjacent nodes and the process ends. If the node is configured to update adjacent nodes, then the node transmits its adjusted traffic rate per session to adjacent nodes with shared MSRP sessions (step 450).

If the node is configured to update adjacent nodes, then the node determines if it is configured to monitor the traffic rate per session of MSRP sessions it shares with adjacent nodes (step 460). If the node is not configured to monitor the traffic rate per session of MSRP sessions it shares with adjacent nodes, then the node does not monitor the traffic rate per session of the MSRP sessions it shares with adjacent nodes and the process ends. If the node is configured to monitor the traffic rate per session of MSRP sessions it shares with adjacent nodes, then the node monitors the traffic rate per session of the MSRP sessions it shares with adjacent nodes. In some embodiments, the node retransmits the updated traffic rate per session to each adjacent node whose MSRP session is transmitting at a traffic rate per session that is substantially different than the updated traffic rate per session. In some embodiments, the node discards MSRP messages received from an adjacent node that is transmitting at a traffic rate per session higher than the node's traffic rate per session.

As discussed above, an adjusted traffic rate per session can be transmitted between nodes. The adjusted traffic rate per session can be transmitted via a header of an MSRP message or via a SIP message.

Figure 5:
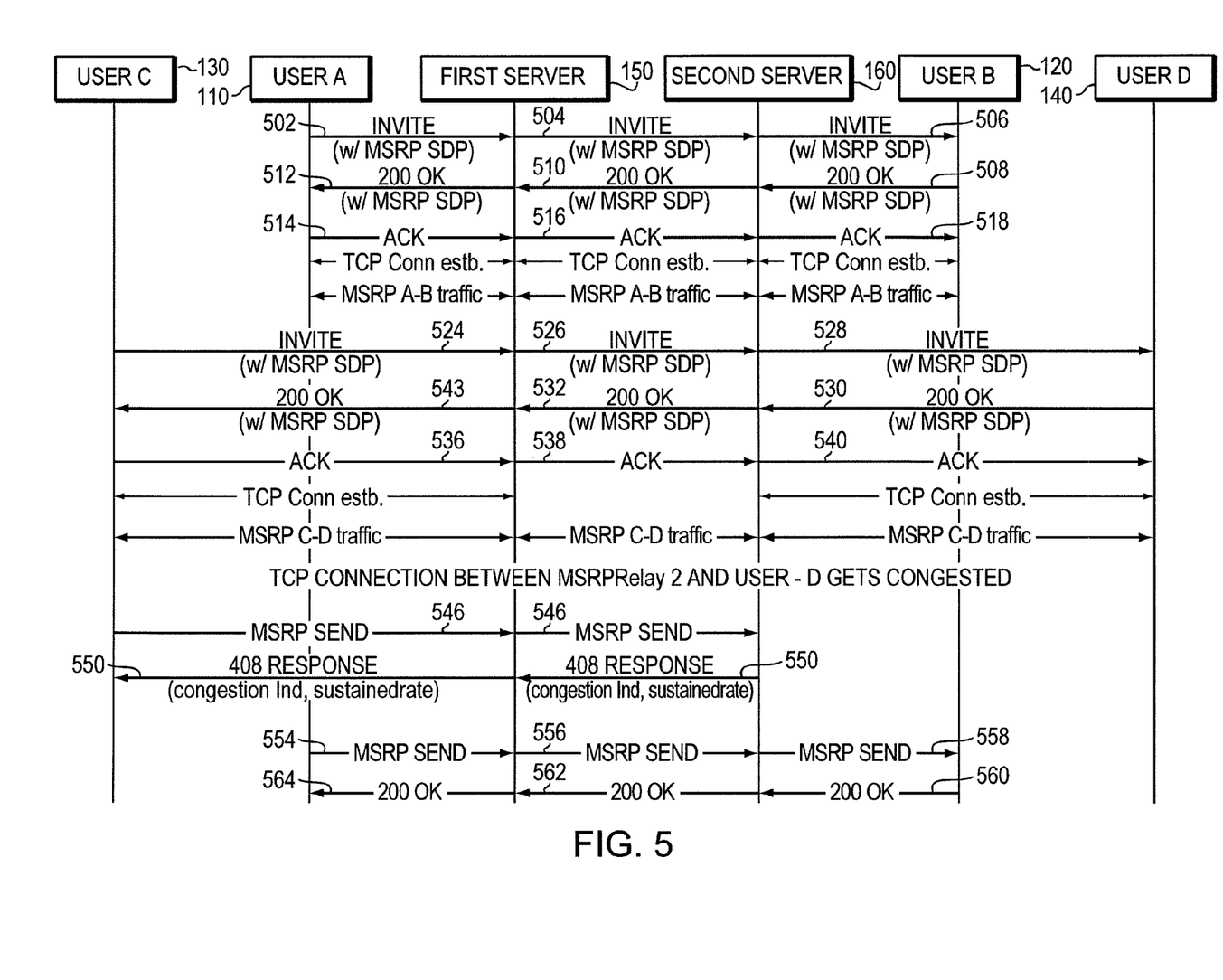
FIG. 5 is a sequence diagram illustrating a process for transmitting a traffic rate per session.

FIG. 5 is a sequence 500 diagram illustrating a process for transmitting a traffic rate per session. A MSRP session is established between user A 110 and user B 120 via a TCP connection. User A 110 requests a MSRP session by transmitting an INVITE with MSRP message 502 to a first server 150 (e.g., a first MSRP relay). The first server 150 requests a MSRP session by transmitting an INVITE with MSRP message 504 to a second server 160, which requests a MSRP session by transmitting an INVITE with MSRP message 506 to user B 120. User B 120 transmits a 200 OK message 508 to the second server 160 indicating acceptance of the second server's request. The second server 160 transmits a 200 OK message 510 to the first server 150 indicating acceptance of the first server's request. The first server 150 transmits a 200 OK message 512 to the user A 110 indicating acceptance of user A's request. User A 110 transmits an ACK message 514 to the first server 150. The first server 150 transmits an ACK message 516 to the second server 160, which transmits an ACK message 518 to user B 120.

A MSRP session is established between user C 130 and user D 140 via the same TCP connection used to establish a MSRP session between user A 110 and user B 120. User C 130 requests a MSRP session by transmitting an INVITE with MSRP message 524 to the first server 150 (e.g., a first MSRP relay). The first server 150 requests a MSRP session by transmitting an INVITE with MSRP message 526 to the second server 160, which requests a MSRP session by transmitting an INVITE with MSRP message 528 to user D 140. User D 140 transmits a 200 OK message 530 to the second server 160 indicating acceptance of the second server's request. The second server 160 transmits a 200 OK message 532 to the first server 150 indicating acceptance of the first server's request. The first server 150 transmits a 200 OK message 534 to the user C 130 indicating acceptance of user A's request. User C 130 transmits an ACK message 536 to the first server 150, which transmits an ACK message 538 to the second server 160. The second server 160 transmits an ACK message 540 to user D 140.

The TCP connection between user D 140 and the second server 160 becomes congested. The second server 160 determines a new traffic rate per session. User C 130 transmits a MSRP send message 546 to the first server 150. The first server 150 forwards the MSRP send message 546 to the second server 160. The second server sends a REPORT with cause 408 message 550 to the first server 150. The REPORT with cause 408 message 550 includes the new traffic rate per session, thus adjusting the traffic rate per session for the MSRP session. The first server 150 transmits the REPORT with cause 408 message 550 to user C 130, which adjusts the rate at which it transmits MSRP messages towards user D 140. User A 110 transmits MSRP message towards user B 120, which acknowledges the messages.

As discussed above, a traffic rate per session can be transmitted from one node to another node using SIP. A SDP 'b-attribute or Bandwidth attribute' with modifier 'AS' as defined in RFC 2237 is used to transmit the traffic rate per session. In embodiments that transmit the traffic rate per session using SIP, a SIP INVITE or UPDATE is transmitted to modify the traffic rate per session.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

The described embodiments of the invention are intended to be merely exemplary and numerous variations and modifications will be apparent to those skilled in the art. All such variations and modifications are intended to be within the scope of the present invention as defined in any appended claims.

The invention claimed is:

1. A computer implemented method of dynamically adjusting a traffic rate per session during a messaging session relay protocol (MSRP) session, comprising:
   receiving, by a first server, a MSRP session request from a second server;
   establishing said MSRP session, said MSRP session not including a retransmission of MSRP messages on a MSRP layer when a transmission of a MSRP message fails;
   adjusting, by the first server, the traffic rate per session based on at least one of policy or scarcity of one or more resources that are internal or external to the first server, said traffic rate per session being the rate at which MSRP messages are transmitted over the MSRP session; and
   transmitting, by the first server, the adjusted traffic rate per session to the second server.

2. The method of claim 1 wherein the scarcity of one or more resources that are internal or external to the first server comprises one or more of a congestion condition of the first server or a status of one or more network elements connected to the first server.

3. The method of claim 2 wherein adjusting the traffic rate per session comprises increasing the traffic rate per session by a value if the congestion condition is that a Transmission Control Protocol (TCP) connection to the first server has less active MSRP messages than a maximum number of active MSRP messages for longer than a monitoring interval.

4. The method of claim 3 wherein the monitoring interval has:
   (i) a first value while the TCP connection to the first server has less active MSRP sessions than a maximum number of active MSRP messages and more active MSRP messages than a maximum number of active MSRP messages; and (ii) a second value while the TCP connection to the first server has more active MSRP messages than a maximum number of active MSRP messages, where the second value is less than the first value.

5. The method of claim 4 wherein the second value decreases exponentially as a duration that the TCP connection to the first server has more MSRP messages than a maximum number of active MSRP messages increases.

6. The method of claim 4 wherein the second value decreases logarithmically as a duration that the TCP connection to the first server has more MSRP messages than a maximum number of active MSRP messages increases.

7. The method of claim 3 further comprising determining the monitoring interval by the first server.

8. The method of claim 3 further comprising determining, by the first server, a number of active MSRP messages of the TCP connection based on a number of MSRP messages in an egress Transmission Control Protocol (TCP) buffer of the first server.

9. The method of claim 3 further comprising determining, by the first server, a number of active MSRP messages of the TCP connection based on a number of MSRP messages in an egress application buffer of the first server.

10. The method of claim 2 wherein adjusting the traffic rate per session comprises decreasing the traffic rate per session by a value if the congestion condition is that a Transmission Control Protocol (TCP) connection to the first server has more active MSRP messages than a minimum number of active MSRP messages longer than a monitoring interval.

11. The method of claim 10 wherein the monitoring interval has:

(i) a first value while the TCP connection to the first server has less active MSRP sessions than a maximum number of active MSRP messages and more active MSRP messages than a minimum number of active MSRP messages; and (ii) a second value while the TCP connection to the first server has more active MSRP messages than a maximum number of active MSRP messages, where the second value is less than the first value.

12. The method of claim 1 wherein adjusting the traffic rate per session comprises setting the traffic rate per session to a value based on a second traffic rate per session received from a third server.

13. The method of claim 1 wherein the adjusted traffic rate per session is transmitted via a MSRP message, a Session Initiation Protocol (SIP) message header, or a Session Description Protocol attribute.

14. The method of claim 1 further comprising receiving, by the first server, a second MSRP session request from a fourth server, wherein the fourth server transmits the second MSRP session request via the TCP connection.

15. A computer program product, tangibly embodied in a non-transitory machine-readable storage device, for dynamically adjusting a traffic rate per session during a messaging session relay protocol (MSRP) session, the computer program product being operable to cause a first server to:

receive a MSRP session request from a second server;

establish said MSRP session, said MSRP session not including a retransmission of MSRP messages on a MSRP layer when a transmission of a MSRP message fails;

adjust the traffic rate per session based on at least one of policy or scarcity of one or more resources that are internal or external to the first server, said traffic rate per session being the rate at which MSRP messages are transmitted over the MSRP session; and transmit the adjusted traffic rate per session to the second server.

16. The computer program product of claim 15 wherein the scarcity of one or more resources that are internal or external to the first server comprises one or more of a congestion condition of the first server or a status of one or more network elements connected to the first server.

17. The computer program product of claim 16 wherein adjusting the traffic rate per session comprises increasing the traffic rate per session by a value if the congestion condition is that a Transmission Control Protocol (TCP) connection to the first server has more active MSRP messages than a maximum number of active MSRP sessions longer than a monitoring interval.

18. The computer program product of claim 16 wherein adjusting the traffic rate per session comprises decreasing the traffic rate per session by a value if the congestion condition is that a Transmission Control Protocol (TCP) connection to the first server has less active MSRP messages than a maximum number of active MSRP sessions longer than a monitoring interval.

19. The computer program product of claim 15 wherein adjusting the traffic rate per session comprises setting the traffic rate per session to a value based on a second traffic rate per session received from a third server.

20. A hardware system for adjusting a traffic rate per session during a messaging session relay protocol (MSRP) session, comprising:

means for receiving a MSRP session request from a second server;

means for establishing said MSRP session, said MSRP session not including a retransmission of MSRP messages on a MSRP layer when a transmission of a MSRP message fails;

means for adjusting the traffic rate per session based on at least one of policy or scarcity of one or more resources that are internal or external, said traffic rate per session being the rate at which MSRP messages are transmitted over the MSRP session; and means for transmitting the adjusted traffic rate per session to the second server.

* * * * *